(12) United States Patent
Miyoshi

(10) Patent No.: US 7,946,037 B2
(45) Date of Patent: May 24, 2011

(54) MICROCHEMICAL DEVICE AND METHOD FOR FABRICATING THE SAME

(75) Inventor: Yoshiyuki Miyoshi, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 270 days.

(21) Appl. No.: 12/239,781

(22) Filed: Sep. 28, 2008

(65) Prior Publication Data

US 2009/0087357 A1    Apr. 2, 2009

(30) Foreign Application Priority Data

Sep. 28, 2007   (JP) ................. 2007-256761

(51) Int. Cl.
*B21D 53/00* (2006.01)
*B01J 19/00* (2006.01)

(52) U.S. Cl. ............... 29/890.09; 422/500; 422/502; 422/504; 422/600; 422/603; 422/130

(58) Field of Classification Search .......... 422/188, 422/100, 130; 29/890.09
See application file for complete search history.

(56) References Cited

U.S. PATENT DOCUMENTS

| | | | |
|---|---|---|---|
| 2004/0022690 A1* | 2/2004 | Kawai et al. | 422/100 |
| 2004/0180377 A1* | 9/2004 | Manger et al. | 435/7.1 |
| 2005/0186115 A1* | 8/2005 | Ichikawa et al. | 422/68.1 |
| 2006/0228734 A1* | 10/2006 | Vann et al. | 435/6 |
| 2008/0153152 A1* | 6/2008 | Wakabayashi et al. | 435/287.2 |
| 2008/0207892 A1* | 8/2008 | Iwaki et al. | 536/55.3 |
| 2009/0239292 A1* | 9/2009 | Thomas et al. | 435/297.5 |

FOREIGN PATENT DOCUMENTS

| | | |
|---|---|---|
| EP | 1 391 237 A2 | 2/2004 |
| JP | 2004-243308 A | 9/2004 |
| JP | 2005-66400 A | 3/2005 |
| JP | 2007-136253 A | 6/2007 |

* cited by examiner

*Primary Examiner* — Walter D Griffin
*Assistant Examiner* — Huy-Tram Nguyen
(74) *Attorney, Agent, or Firm* — Sughrue Mion, PLLC

(57) ABSTRACT

In a microchemical device including a plurality of flow channels which feed liquids from at least one fluid supply device into a plurality of reaction zones, each of the plurality of flow channels has a plurality of minute flow channel members each of which has a cross sectional area smaller than that of the reaction zone. Thereby, the fluids are evenly fed into each of the microreaction members. Thus, a microchemical device capable of homogenizing a substance generated on respective reactions can be realized.

7 Claims, 9 Drawing Sheets

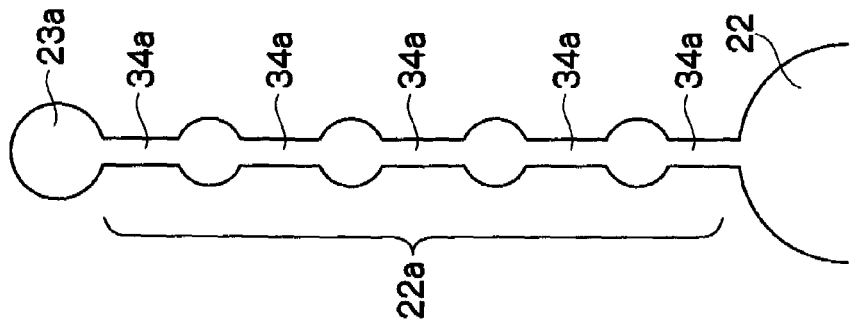
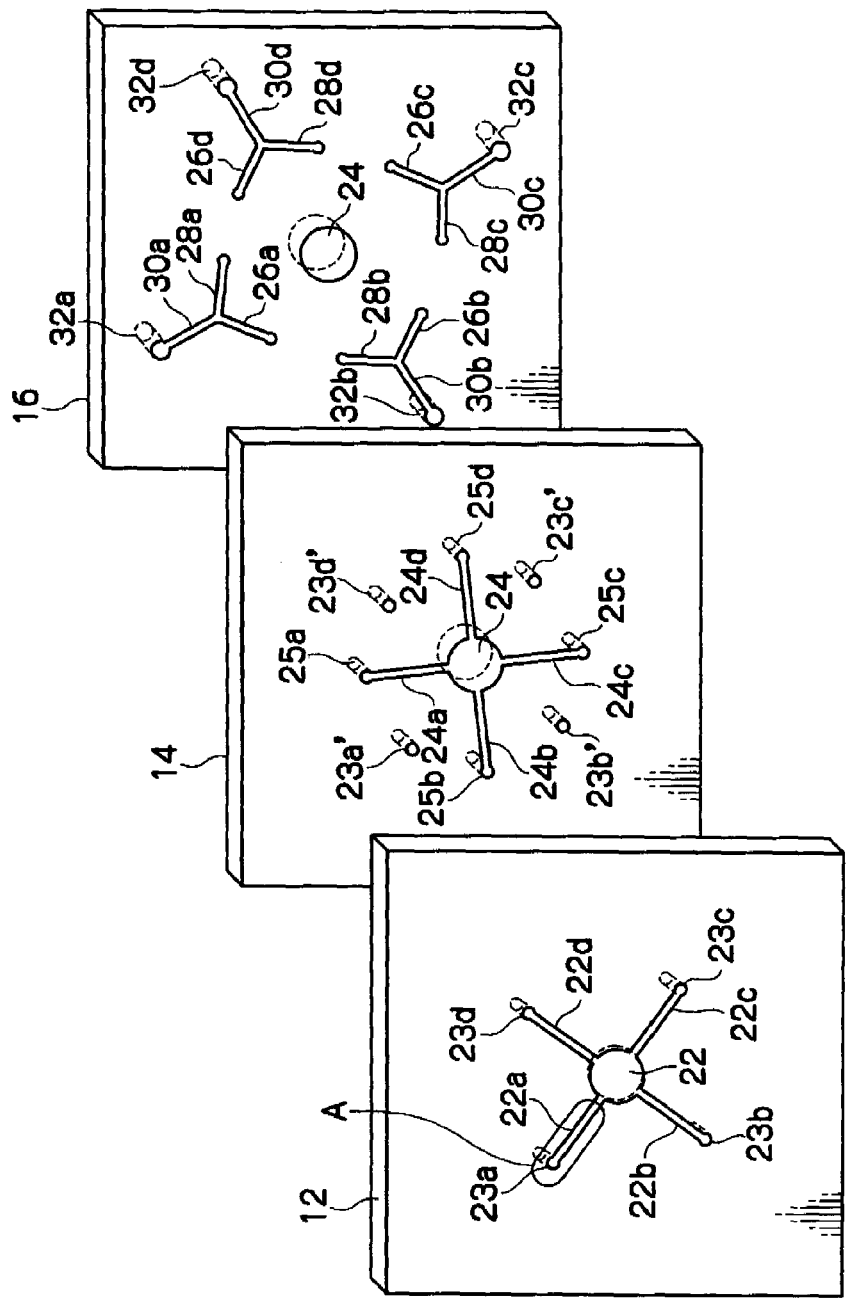

MICROCHEMICAL DEVICE AND METHOD FOR FABRICATING THE SAME

BACKGROUND OF THE INVENTION

1. Field of the Invention

The present invention relates to a microchemical device and more particularly, it relates to the microchemical device capable of evenly feeding fluids into a reaction zone and homogenizing a substance generated in each reaction.

2. Description of the Related Art

Recently, so-called a microreactor for allowing fluids to react or mix each other while precisely controlling the fluids in a minute space attracts attention. However, because a volume of the microreactor was small, there was a problem that its processing capacity per unit time was low in an industrial application. For such a mass production technology, in a conventional field of chemical industry, it has been attempted to adapt by scale up of a reacting member. For the microreactor, however, because the scale is an important parameter for deciding the performance of the reactor, even though the processing capacity was raised by increasing the dimensions (volume) of the microreactor, it became impossible to perform desired reaction and mixing. Therefore, study on the mass production by simple scale up could not work.

To solve the above problem, as disclosed in Japanese Patent Application Publication No. 2004-243308, a mass production by so-called numbering-up, which is a strategy for increasing the processing capacity per unit time by using a plurality of microreaction members in parallel, has been studied.

The success in the above numbering-up depends on how to evenly distribute the fluid into the microreactors arranged in parallel. Usually, two or more kinds of fluid are evenly mixed at a merging member in the microreactor, however, when each fluid is not evenly distributed, it causes a problem that a product obtained in respective reactors becomes different between each other.

Unlike the distribution in the normal macro-field, the fabrication error becomes relatively large in the even distribution in the micro-field. Therefore, it is difficult to realize. To achieve the even distribution, there are countermeasures such as selecting a manufacturing method with little production error, preparing the number of pumps equivalent to the number of numbering-up or the like; however, there was also a problem that each countermeasure requires much cost.

Thereupon, attempts for evenly distributing between respective reactors are carried out such as: a structure with periodically narrowed down cross sectional areas after the merging member of the reactor as disclosed in Japanese Patent Application Publication No. 2005-66400; and a structure in which plural times of distributions are repeated with reducing the number of distributions at a time, instead of conducting a large number of distributions at one time, as disclosed in Japanese Patent Application Publication No. 2007-136253.

SUMMARY OF THE INVENTION

However, because the periodic structure is disposed after the merging member in the structure described in Japanese Patent Application Publication No. 2005-66400, there was a possibility that the flow after joining will fall into disorder and the precise reaction control as a feature of microreactor will be obstructed. Further, although an effect of suppressing production error at a distributing member in the downstream can be expected in the structure described in Japanese Patent Application Publication No. 2007-136253, there was a possibility that a tremendous influence will be given to a distributing property in the downstream side when a large error generates at a distributing member in the upstream.

The present invention has been made in view of the above situation, and accordingly, an object of the present invention is to provide a microchemical device capable of homogenizing the substance generated on respective reactions by making the pressure of each channel in a fluid supply system including two or more microreaction members equivalent, and by sending the fluids into respective microreaction members evenly. Moreover, at the same time, the present invention provides the microchemical device with reduced production cost.

In order to achieve the above object, a first aspect of the present invention provides a microchemical device including a plurality of flow channels which feed liquids from at least one fluid supply device into a plurality of reaction zones, wherein each of the plurality of flow channels comprises a plurality of minute flow channel members each of which has a cross sectional area smaller than that of the reaction zone.

According to the first aspect of the present invention, since the minute flow channel members each of which has a cross sectional area smaller than that of the reaction zone are provided in each of the flow channels, the pressure in the respective flow channels can be adjusted by the minute flow channel members and accordingly, it is possible to feed the fluid uniformly into each flow channel.

Further, since the first aspect of the present invention relates to a microchemical device, the production errors of the device will relatively affect a feeding amount of the fluid. According to the first aspect, because the total summation of the volumes of the minute flow channel members in each flow channel can be made uniform by providing a plurality of minute flow channel members, it is possible to feed the fluid uniformly into each flow channel.

Further, since the minute flow channel members are disposed before the flow channel, in other word, a reaction zone (microreaction portion), it is possible that the reaction is allowed to proceed in the reaction zone without being affected by pressure.

According to a second aspect of the present invention, in the microchemical device according to the first aspect of the present invention, the flow channel includes not less than 10 of the minute flow channel members per one flow channel.

According to the second aspect of the present invention, since the flow channel contains not less than 10 of the minute flow channel members of per one flow channel, a total summation of errors in machining accuracy is averaged and it is possible to equalize the pressure in each flow channel feeding the fluid. Particularly, setting the number of the minute flow channel members as not less than 10, can achieve the effect of homogenizing the total summations of the errors.

According to a third aspect of the present invention, in the microchemical device according to any one of the first and the second aspects of the present invention, viscosity of the fluid supplied from the fluid supply device is not larger than 30 cp.

According to the third aspect of the present invention, since the viscosity of the fluid is not larger than 30 cp, the fluid becomes less sensitive to the pressure by the device and, as a result, it becomes possible to feed the fluid evenly.

According to a fourth aspect of the present invention, in the microchemical device according to any one of the first to third aspects of the present invention, flow rate of the fluid supplied from said fluid supply device is not less than 1 cc/min but not more than 1000 cc/min.

According to the fourth aspect of the present invention, since the flow rate of the fluid is not less than 1 cc/min but not more than 1000 cc/min, the pressure applied to the flow channels can be suppressed and it becomes possible to reduce the difference in pressure in each flow channel.

According to a fifth aspect of the present invention, in the microchemical device according to any one of the first to fourth aspects of the present invention, an equivalent diameter of the cross sectional area of the minute flow channel member is not larger than 80% of an equivalent diameter of a portion whose cross sectional area is the smallest in the reaction zone.

According to the fifth aspect of the present invention, since the equivalent diameter of the cross sectional area of the minute flow channel member is not larger than 80% of the equivalent diameter of a portion whose cross sectional area is the smallest in the reaction zone, the pressure can be applied to the minute flow channel member rather than the reaction zone. Therefore, by evenly applying pressure to the minute flow channel members, it becomes possible to feed the fluids evenly into the reaction zone.

A sixth aspect of the present invention provides a method for fabricating the microchemical device according to any one of the first to fifth aspect, and the method includes forming the flow channels before forming the minute flow channel members.

The method according to the sixth aspect enables to fabricate the microchemical device with high dimensional accuracy.

According to a seventh aspect, the method according to the sixth aspect further includes forming the minute flow channel members in flow channels in a manner in which total summations of sequence numbers for forming the minute channel members arranged in respective flow channels become as equal as possible for all of the flow channels.

The method according to the seventh aspect enables to reduce manufacturing error caused by the abrasion of the drill during fabrication.

According to the present invention, since the pressures among the plurality of the flow channels can be equalized, it becomes possible to feed the fluid evenly into the respective flow channels. Accordingly, the reactant generated in the reaction at each reaction zone can be homogenized. Further, since the pressure is equalized by the simple structure, comparing with the conventional devices, having a plurality of minute flow channel members and by utilizing the statistics obtained by measuring production errors of the minute flow channel members, the manufacturing cost and component cost can be reduced. Further, a method for fabricating the microchemical device according to the present invention with high accuracy is provided.

BRIEF DESCRIPTION OF THE DRAWINGS

FIG. 1A is an exploded perspective view about the constituting members of the microchemical device in the first embodiment, which was drawn by disassembling it;

FIG. 1B is a partially enlarged view of the flow channel;

DETAILED DESCRIPTION OF THE PREFERRED EMBODIMENTS

Preferred embodiments of the microchemical device in accordance with the present invention will now be described in detail with reference to the accompanying drawings.

The First Embodiment

Figure 2:
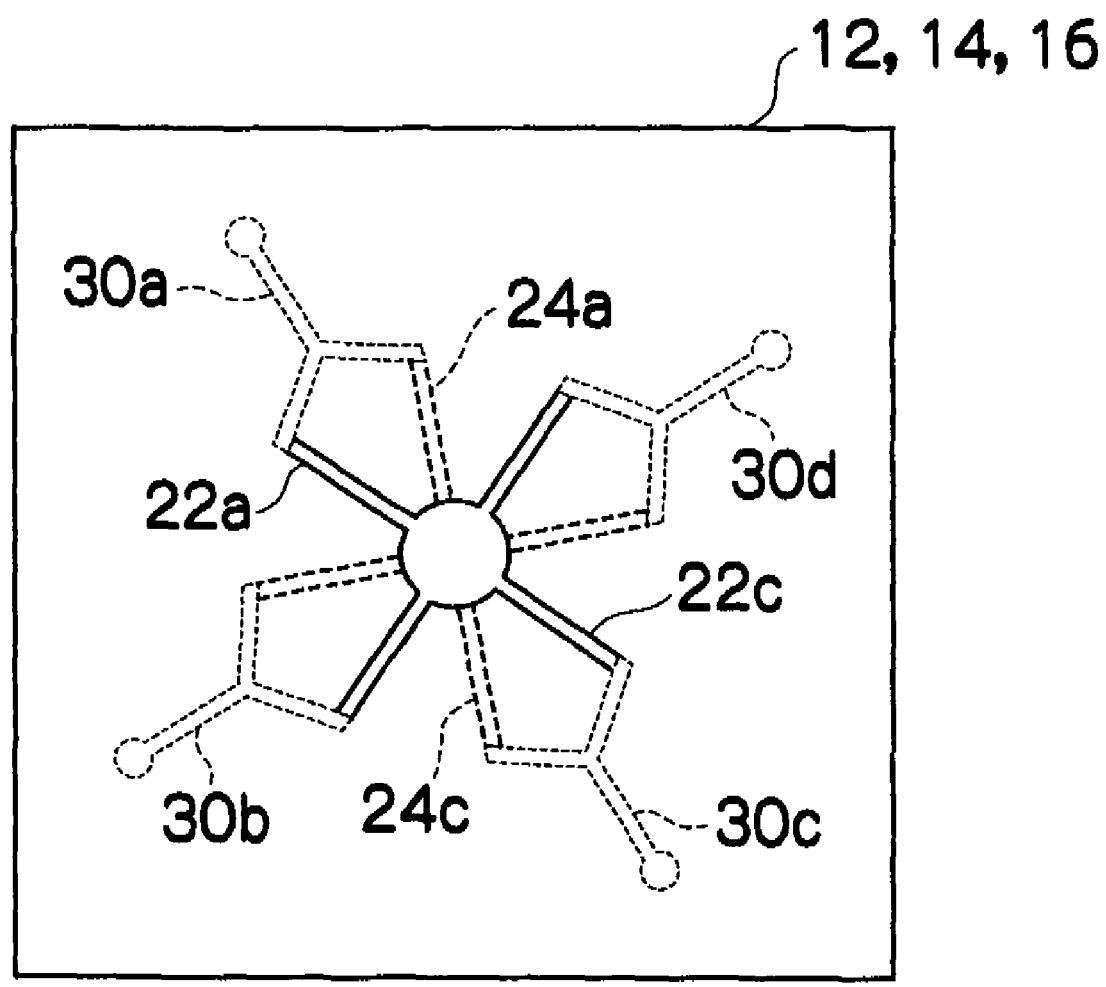
FIG. 2 is a top plan view of the microchemical device shown in FIG. 1.

FIG. 1A is an exploded perspective view illustrating an example of a numbering-up type microchemical device 10 in the first embodiment. FIG. 1B is a partially enlarged view of the flow channel A in FIG. 1A. FIG. 1A illustrates an exploded perspective view about three elements constituting the microchemical device 10 drawn by disassembling it. FIG. 2 is a top plan view of the microchemical device illustrating the above three elements in the state of being laminated each other.

As shown in FIG. 1A, the microchemical device 10 in the present embodiment includes at least the first supply element 12 for supplying the first solution, the second supply element 14 for supplying the second solution and a merging element 16 for allowing the first and the second solutions to mix and react each other. The microchemical device 10 is assembled by fastening and laminating at least these respective elements integrally. Examples of the method for assembling the microchemical device include, by providing bores (or holes, not shown) which penetrate through a cylinder in the circumferential part of each element at equal intervals each other, and to fasten those elements by means of bolt/nut integrally; to bond those elements directly; to unite those elements using adhesives or the like.

At the center of an opposite side of the merging element 16 in the first supply element 12, a circular retention member 22 not penetrating through it in the thickness direction is formed. From the retention member 22, four flow channels 22a, 22b, 22c, and 22d are provided in radial. Respective end portions of the flow channels 22a, 22b, 22c, and 22d communicate with bores 23a, 23b, 23c, and 23d penetrating through them in thickness direction respectively. Bores 23a to 23d are provided in the same manner as the second supply element, penetrating in their thickness directions.

The cross-sectional shape of respective flow channels 22a to 22d may be rectangular or circular (including semicircular), not particularly limited thereto. Regarding the cross sectional area of the flow channel, although not particularly speculated, it is preferable in the viewpoint of a system stability to be within the range capable of forming a laminar flow. As the condition capable of forming the laminar flow, it is preferable for the equivalent diameter to be usually not longer than 2 mm, and more preferably not longer than 600 μm. Further, although the number of diverging flow channels are 4 in the present embodiment; they may be 2, 3, or not less than 5, without particularly limited.

FIG. 1B illustrates a partially enlarged view of the flow channel 22a. Among the flow channel 22a, minute flow channel members 34a having smaller cross sectional areas are provided so as to adjust the pressure in the respective flow channels. Each of the flow channels has a plurality of minute flow channel members 34a, and the shapes of the minute flow channel members may be possibly various including a curve, a wave in addition to a cube or a rectangular prism. It is desirable for the cross sectional equivalent diameter of the minute flow channel member to be not larger than 80%, preferably not larger than 50% of an equivalent diameter of a portion whose cross sectional area is the smallest in the minute reaction member.

Further, although the minute flow channel members 34a are provided in series in five positions in FIG. 1A, they may be disposed in parallel. In the case where they are disposed in parallel, the fluids are distributed into the plural minute flow channel members 34a from the retention member 22, and are supplied into bores 23. Furthermore, it is preferable that the total summation of the lengths of the minute flow channel members 34a in respective flow channels 22a to 22d is not shorter than the length from the inlet to the outlet of a reaction zone described below. By designing the length of the minute flow channel members 34a in the respective flow channels 22a to 22d longer than the length of the reaction zone, it becomes possible to adjust a feeding amount of the fluids flowing through the flow channels 22a to 22d thereby enabling to feed the fluids uniformly.

The number of the minute flow channel members 34a, as long as they can suppress the variation of the product in the reaction zone described below within a range not giving any hindrance to the product, may be changed without particularly specifying the number. However, to satisfy the even distribution property required by the fluid, it is preferable to provide a sufficient number of minute flow channel members 34a which are needed statistically. Additionally, since the allowable range of the variation in the product should be different depending on the shape of the minute flow channel member 34a or on the reacting fluids, it is possible to change the number of the minute flow channel members 34a appropriately, however, it is preferable to provide minute flow channel members 34a in the number of not less than 10 among the respective flow channels.

In addition, in FIG. 1A, the respective minute flow channel members 34a are disposed periodically with the equal distance among the flow channel 22a. However, when the minute flow channel members are provided in the number that is needed, it is not necessary to dispose them periodically.

In the second supply element 14, a through hole 24 penetrating in its thickness direction is provided in the central portion. From the through hole 24, four flow channels 24a, 24b, 24c, and 24d without penetrating in its thickness direction are provided in radial.

The four flow channels 24a to 24d provided in the second supply element 14 are formed so as not to overlap with the flow channels 22a to 22d in the first supply element 12 when they are laminated with the first supply element. Respective end portions of the flow channels 24a, 24b, 24c, and 24d communicate with bores 25a, 25b, 25c, and 25d penetrating through them in thickness direction respectively. Additionally, the cross sectional shape, cross sectional area and the number of the diverging flow channel about each flow channel can be designed to the same constitution as the first supply element. Further, also in the second supply element 14, by providing the minute flow channel members similarly with the first supply element, the pressures are equalized and the fluids are fed evenly.

In the merging element 16, introduction channels 26a, 26b, 26c, and 26d communicating with the bores 23a to 23d of the first supply element 12, introduction channels 28a, 28b, 28c, and 28d communicating with the bores 25a to 25d of the second supply element 14, and mixing channels 30a, 30b, 30c, and 30d for allowing those to join each other are formed.

At the end portions of respective mixing channels 30a to 30d, bores 32a, 32b, 32c, and 32d penetrating them in their thickness direction are formed and composed so as to communicate with exhaust slots that are not illustrated respectively. In the present invention, the reaction zone is defined as a structural body composed of at least two or more introduction channels, one or more reaction channels, and a reaction channel forming a merging member by intersecting the introduction channels for respective fluids extended from their inlets at one point, for the purpose of allowing the fluids to mix and react each other from the merging member toward the outlet. Regarding the shape of the structural body, in addition to Y-shaped body as shown in FIG. 1A, examples include the structural body such as T-shaped, KM reactor or the like. Further, regarding the size of the reaction zone, the equivalent diameters of the introduction channel and the reaction channel are not larger than 1000 μm over the entire zone.

Furthermore, at the central portion of the merging element 16, the through hole 24 is formed so that it overlaps and communicates with another through hole 24 when it laminates with the second supply element 14. Thereupon, the second solution can be taken in from the supply port (not shown) via the through hole 24 of the merging element 16.

Although the fluid used for the microchemical device of the present invention is not particularly limited, it is preferable that the microchemical device is used with the flow rate of the fluid in the range of from 1 to 1,000 cc/min. Further, since the important physical property is a pressure in the present invention, a viscosity of the fluid becomes important. Further, it is preferable for the viscosity to be low viscosity and specifically, the fluid with the viscosity of not more than 30 cp is preferable. Regarding the kind of the fluid, specifically appropriate examples include water; acid solutions; alkaline solutions; organic solvents such as methanol, ethanol or dimethylsulfoxide; or a mixed solution of those; and further, a dispersion liquid prepared by dispersing fine particles into the foregoing liquid or the mixed solution. The fine particles are referred as particles having diameters of not longer than 1 μm herein.

As materials for the member constituting the microchemical device 10, those having a high strength, having a corrosion resistant property, and enhancing flow property of the ingredient fluid are preferable. For example, metal materials (iron, aluminum, stainless steel, titanium, various alloys, or so), resin materials (fluororesin, acryl resin, or so), glasses (quartz or so), ceramics (silicon or so) are employable.

For the purpose of fabricating the microchemical device 10, a microfabrication technique is employable. Examples of the applicable microfabrication technique include, as already mentioned partially, LIGA (Roentgen-Lithographie Galvanik Abformung) technique using X-ray lithography, a high-aspect-ratio photolithography process using EPON SU-8 (Trade name), a micro electrical discharge machining technique (μ-EDM (Micro Electro Discharge Machining)), a high-aspect-ratio processing technique for silicon by Deep RIE (Reactive Ion Etching), Hot Emboss processing method, an optical molding method, a laser processing method, an ion beam processing method, a mechanical micro cutting processing method using micro tool made of a stiff material such as diamond, and so on. These techniques may be used alone or in combination of two or more of them. Preferable microfabrication techniques are LIGA technique using X-ray lithography, the high-aspect-ratio photolithography process using EPON SU-8 the micro electrical discharge machining technique (μ-EDM), and the mechanical micro cutting processing method.

Regarding a method for bonding between the elements or the members, a precise bonding method keeping accuracy in the size without accompanied by a break of flow channel caused by deterioration or deformation of material induced by high temperature heating is desirable. It is preferable to select a solid state bonding (for example, pressure bonding, diffusion bonding or the like) or a liquid phase bonding (for example, welding, eutectic bonding, soldering, adhesion, or the like) as the precise bonding method in view of a relation with a material for fabrication. Examples include a silicon direct bonding that bonds silicons each other when using a silicon as the material, a fusion welding that welds glasses each other, an anode bonding that bonds silicon and glass, a diffusion bonding for connecting metals each other, etc. Concerning about bonding of ceramics, bonding technique except a mechanical seal technique for such as metal is needed, and there is a heat treatment process applying an adhesive named glass solder over alumina up to a film thickness of 80 μm in accordance with screen printing, followed by heating at 440 to 500° C. without pressuring. Further, as new techniques, a surface activation bonding, a direct bonding with the use of hydrogen bond, a bonding with the use of HF (hydrogen fluoride) aqueous solution, etc. are known.

<Manufacturing Process for Minute Flow Channel Member>

The present invention provides a plurality of minute flow channel members among respective flow channels, and by averaging a total summation of errors in machining accuracy (a little position gaps that may occur in every machining, shaft shake, etc.), equalizes the pressure in each flow channel uniformly and as a result, feeds the fluid evenly. Accordingly, a manufacturing method for the flow channel and for the minute flow channel member becomes important.

Figure 3A:
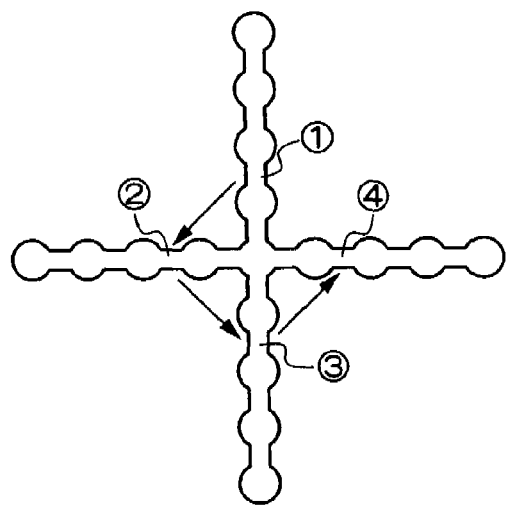
FIGS. 3A, 3B and 3C show explanatory views for illustrating a process for manufacturing a minute flow channel member.
Figure 3B:
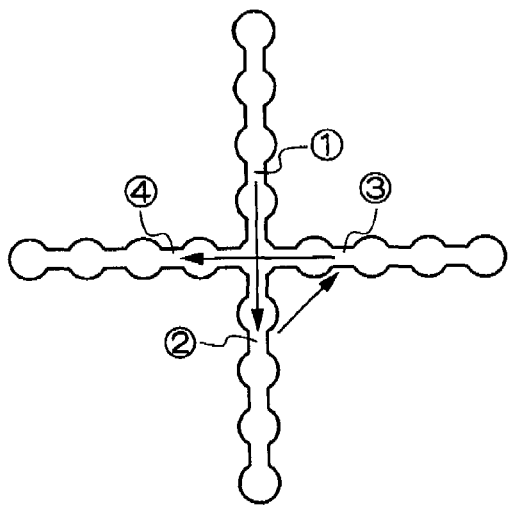
Figure 3C:
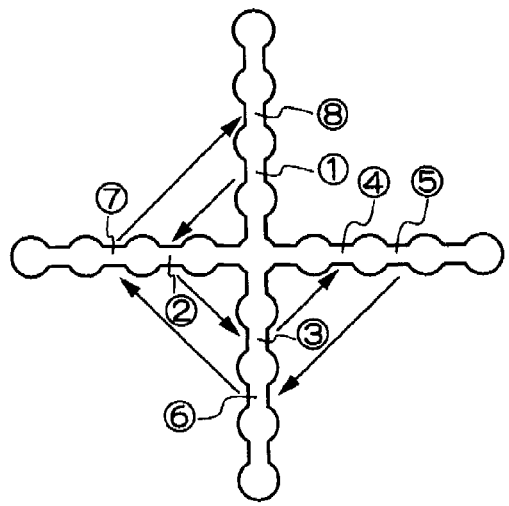

Regarding the manufacturing method for the flow channel having the minute flow channel members, it is preferable to form the flow channel except the minute flow channel members at first, and then, to form the minute flow channel members. Further, even in this case, when another flow channel is formed after all of the minute flow channel members of a certain flow channel has been formed, there exists an anxiety of generating errors caused by an abrasion in a drill. That is, a non-negligible error may occur between the flow channel member first formed and the flow channel member last formed because of the abrasion of the drill during the manufacturing. Therefore, it is preferable that the minute flow channel members of respective flow channels are formed in order. Explanatory views for illustrating procedures for manufacturing the minute flow channel member are shown in FIGS. 3A, 3B and 3C. FIG. 3A illustrates procedures for manufacturing the minute flow channel members of each flow channel on a circumference of a circle in order. However, the fabrication may be carried out regardless of the order particularly, so far as the process does not concentrate on the same flow channel. For example, it is possible to form them diagonally as shown in FIG. 3B. Further, when the minute flow channel members are formed plural times, it is preferable to make the total summations of the orders (sequence numbers) for forming the minute flow channel members in respective flow channel members as equal as possible. For example, the minute flow channel members are formed in respective flow channels counter clockwise at first, as shown in FIG. 3C. Next, the minute flow channel members are formed clockwise. FIG. 3C is the explanatory view for manufacturing the minute flow channel members at two positions in each flow channel. In FIG. 3C, the orders (sequence numbers) for forming the minute flow channel members in the upper channel member are one and eight, and thus the total summation of the orders in the upside channel member is nine. Similarly, the total summation of the orders in the lower channel member is: three plus six equals nine. The total summation of the orders in the right channel member is: four plus five equals nine. The total summation of the orders in the left channel member is: two plus seven equals nine. Therefore, the total summations of the orders in respective flow channel members (upper, lower, right and left) are nine. As described above, since the minute flow channel members are formed in a manner in which total summations of sequence numbers for forming them in respective flow channels become as equal as possible for all of the flow channels, it becomes possible to reduce manufacturing errors caused by the abrasion of the drill during fabrication.

Figure 4:
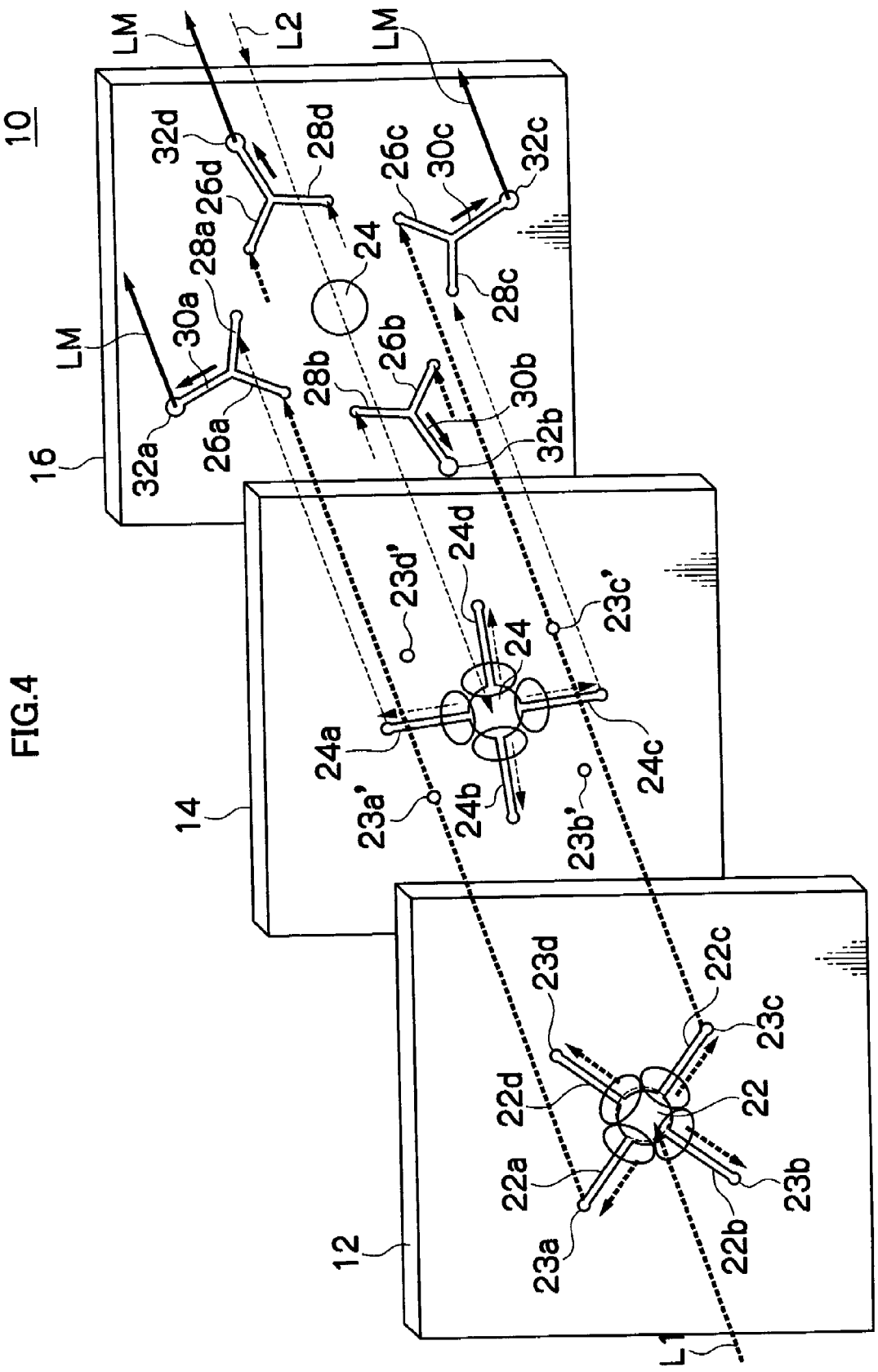
FIG. 4 is an explanatory view for illustrating an operation of the microchemical device in the first embodiment.

In such the microchemical device 10, the first solution is supplied from the first supply port, not shown, into the retention member 22 in the first supply element (bold broken arrows) as shown in FIG. 4. Being divided into four, the first solution flows through four flow channels 22a to 22d and then, further flows through bores 23a to 23d. By providing the minute flow channel members among the flow channels 22a to 22d, the pressure losses are averaged and the first solution flowing through the bores 23a to 23d will be fed evenly. Thereafter, the fluids flow through bores 23a', 23b', 23c' and 23d' that are provided in the second supply element and then, arrive at introduction channels 26a to 26d of the merging element 16 for communicating with opening portions of bores 23a' to 23d' in the merging element 16.

Similarly, the second solution is supplied via the through hole 24 in the merging element 16 into the through hole 24 in the second supply element, which is in reverse direction with the flowing direction of the first solution from the second supply port, not shown. Subsequently, being divided into four, the second solution flows through four flow channels 24a to 2dd and then, further flows through bores 25a to 25d. Similarly, for the second solution, by providing the minute flow channel members among the flow channels 24a to 24d, the pressure losses are averaged and the solution will be fed evenly. Then, the fluids will arrive at introduction channels 28a to 28b of the merging element 16 for communicating with opening portions of bores 25a, 26b, 25c, and 25d in the merging element 16 (thin broken arrows).

At four mixing channels 30a to 30d formed in the merging element 16, the first solution and the second solution supplied respectively as described above will join each other and will be allowed to mix or react each other. Afterwards, a solution including reaction product flows through bores 32a, 32b, 32c and 32d, and will be withdrawn through an exhaust slot, not shown, toward outside (solid line arrows).

The Second Embodiment

Figure 5:
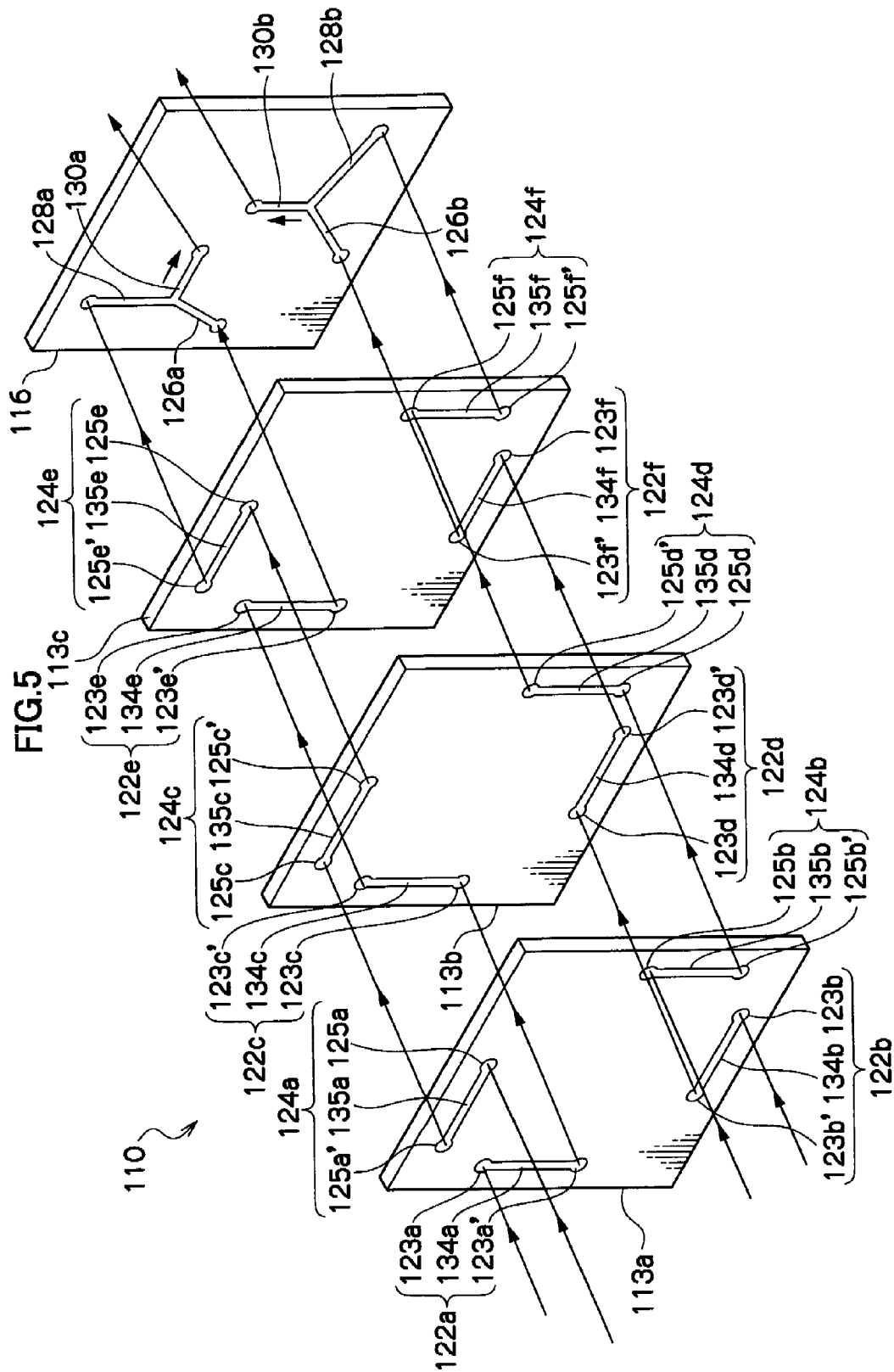
FIG. 5 is an exploded perspective view about the constituting members of the microchemical device in the second embodiment, which was drawn by disassembling it.

FIG. 5 is a perspective view explaining one example of a microchemical device 110 of numbering-up type of the second embodiment. FIG. 5 illustrates an exploded perspective view about a supply element 113 constituting the microchemical device 110 drawn by disassembling it.

As shown in FIG. 5, the microchemical device 110 in the second embodiment is composed of a plurality of supply elements 113a, 113b, 113c and a merging element 116; and by laminating a plurality of supply elements 112, it adjusts the number of the minute flow channel members and makes the pressure of each flow channel equivalent.

On the first supply element 113a, a receptive member 123a without penetrating in its thickness direction is formed. On the supply element 113a, a minute flow channel member 134a is formed from the receptive member 123a, and a flow channel 122a with a through member 123a' penetrating in its thickness direction at its end portion is formed. Also on the second supply element 1 13b, a receptive member 123c, a minute flow channel member 134c and a flow channel 122c with a through member 123c' and for feeding the first fluid are formed similarly. A communication between the through member 123a' of the first supply element 1 13a and the receptive member 123c of the second supply element 113b, together with making the second supply element 113b and the third supply element 113c to have similar constitution, enable to feed the first solution into the merging element 116. Also in FIG. 5, a flow channel for feeding the first fluid is formed at another one place, and a flow channel 124 being composed of a demand member 125, a minute flow channel member 135, and a through member 125' is formed at two places for providing the second flow channel, being with the similar constitution. Additionally, although there are two flow channels for feeding the first solution and there are two flow channels for feeding the second solution in FIG. 5, the embodiment can be executed without restricting the number of the flow channels.

In FIG. 5, since the minute flow channel members 134 and 135 are provided one by one on each supply element 113 of respective flow channels 122 and 124, the numbers of the minute flow channel members 134 and 135 can be increased by laminating the supply element 113 into plural layers. Also, it is possible to increase the number of the minute flow channel members by designing the flow channel to be formed on the supply element 113 as the first embodiment.

On the merging element 116, mixing channels 130a and 130b for joining introduction channels 126a and 126b communicating with through members 123e' and 123f' of the third supply element 113c together with introduction channels 128a and 128b communicating with through members 125e' and 125f' each other are formed and composed so as to communicate with exhaust slots that are not illustrated respectively. With regard to these constitutions, the same constitution as the first embodiment can be employed.

Effects of the present invention will be explained by means of the simulation in the following.

Figure 6A:
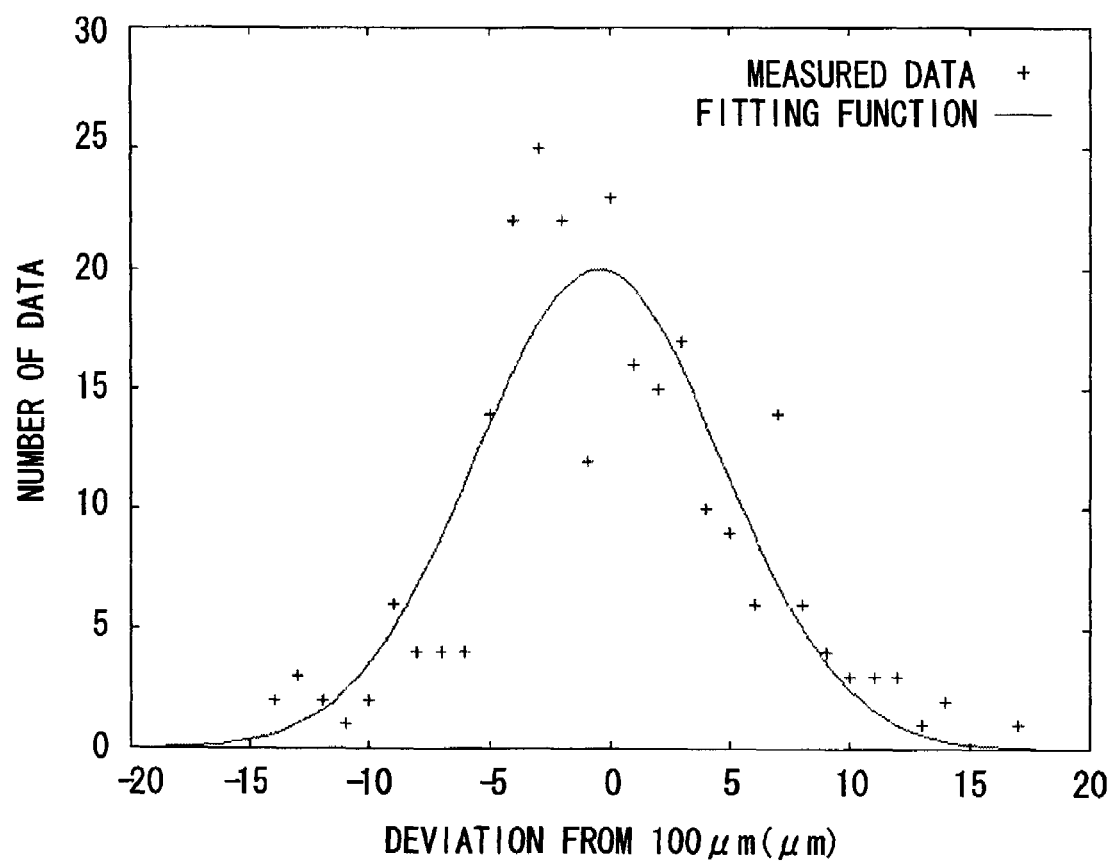
FIGS. 6A to 6D are explanatory views for illustrating a simulation result about the variation of flow rate depending on the number of the minute flow channel member.

At first, 256 holes with φ 100 μm were formed in accordance with a machining work for the purpose of measuring production errors of the minute flow channel member, and errors of respective holes from 100 μm were measured. The results are shown in FIG. 6A. As shown in FIG. 6A, it is verified that the production errors of the minute flow channel members fall within the normal distribution.

Figure 6B:
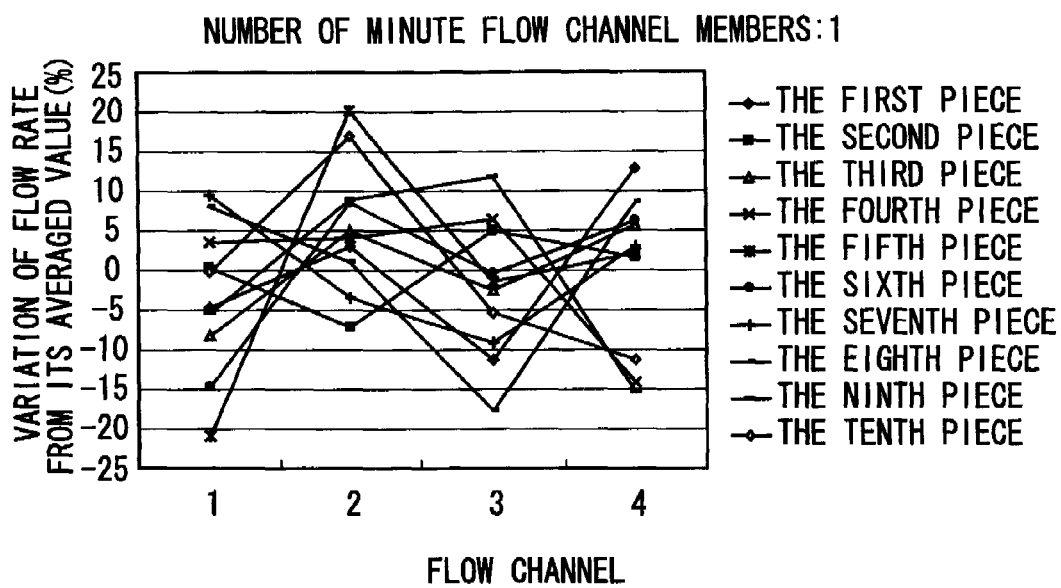
Figure 6C:
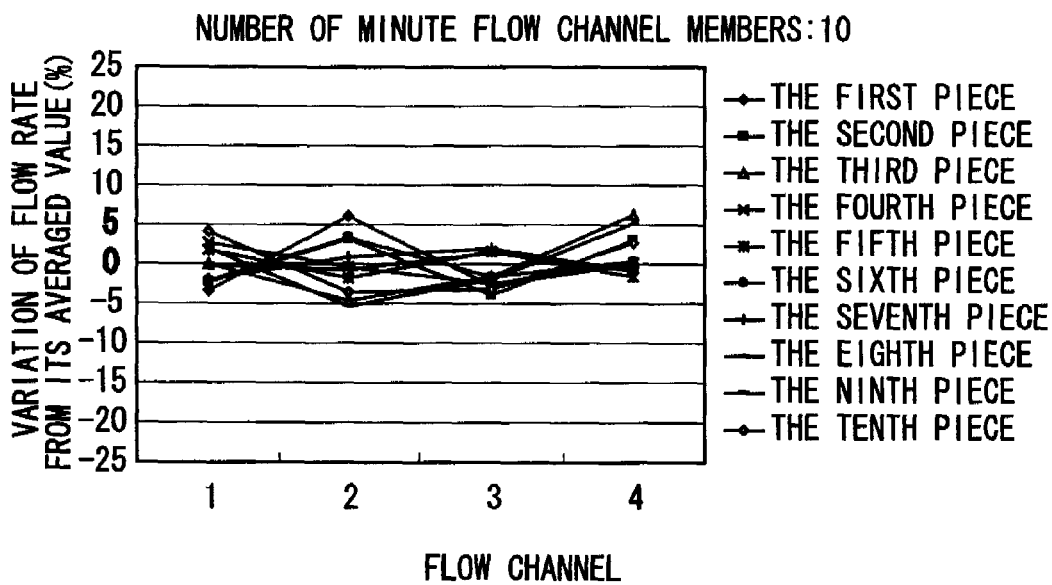
Figure 6D:
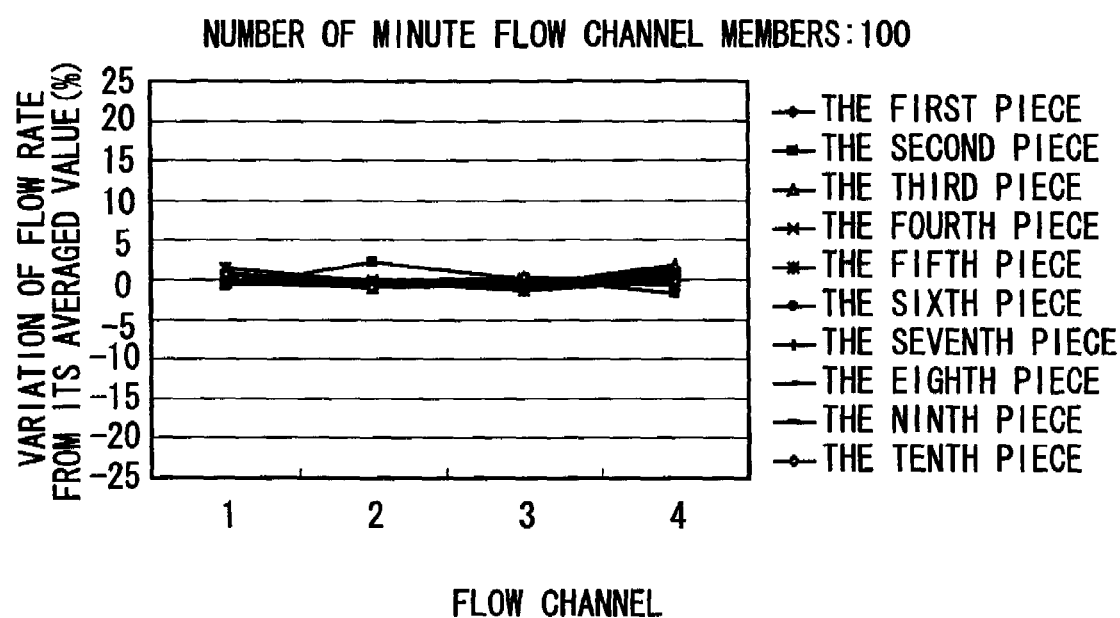

Based on the results in FIG. 6A, numerical simulations were carried out and variations of the flow rate on the condition when the numbers of the minute flow channel members of respective flow channels are 1, 10 and 100 were measured by the simulations. Calculations were conducted by setting the fluid to be fed as water, and setting the flow rate as 3 cc/min in order for satisfying a laminar flow condition. The results are shown in FIGS. 6B to 6D (FIG. 6B illustrates when the number of the minute flow channel member is 1; FIG. 6C illustrates when the number of the minute flow channel member is 10; and FIG. 6D illustrates when the number of the minute flow channel member is 100).

FIGS. 6A to 6D verify that by increasing the number of the minute flow channel members, the variation of the flow rate can be suppressed. Truly, in FIG. 6C wherein the number of the minute flow channel members is 10, the variation is not larger than ±5%, and in FIG. 6D wherein the number is 100, the variation is not larger than ±3%. Therefore, it can ensure that the effect appears by designing the number of the minute flow channel members as not less than 10.

Figure 7:
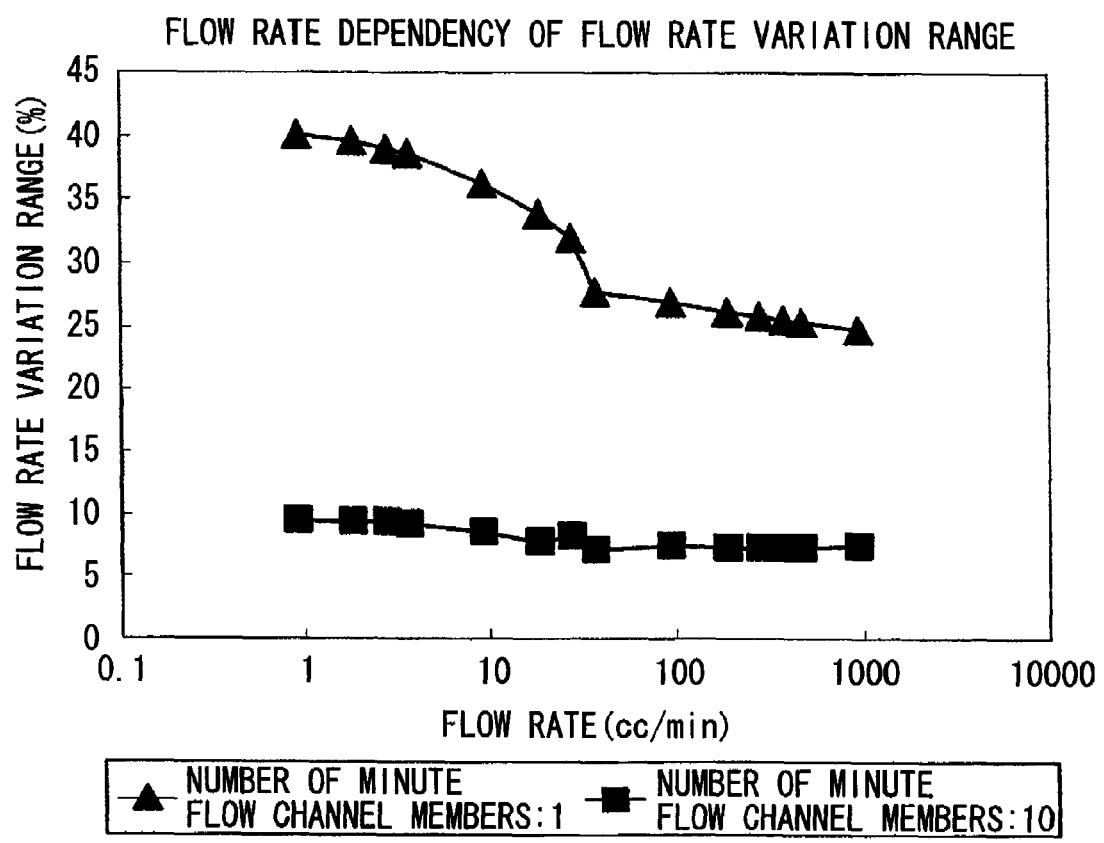
FIG. 7 is an explanatory view for illustrating a simulation result about the variation of the flow rate depending on the difference of the flow rate.

For the purpose of further verifying the effect of the present invention, a flow rate dependency of the variation was confirmed for the cases that the number of the minute flow channel members were 1 and 10. The results are shown in FIG. 7. Calculations were conducted by setting the fluid to be fed as water, and changing the flow rate within the range of from 1 to 1,000 cc/min; similarly as the above mentioned condition. From FIG. 7, it is verified that the variations are smaller in the whole range of from 1 to 1,000 cc/min; about the device wherein the number of the minute flow channel members is 10. From the above results, the superiority in the occasion of designing the number of the minute flow channel members as not less than 10 in the above flow rate range can be further ensured.

What is claimed is:

1. A microchemical device comprising a plurality of flow channels which feed liquids from at least one fluid supply device into a plurality of reaction zones, wherein
    each of the plurality of flow channels comprises a plurality of minute flow channel members each of which has a cross sectional area smaller than that of the reaction zone and that of the flow channel, inside the flow channel.
2. The microchemical device according to claim 1, wherein the flow channel comprises not less than 10 of the minute flow channel members per one flow channel.
3. The microchemical device according to claim 1, wherein viscosity of the fluid supplied from the fluid supply device is not larger than 30 cp.
4. The microchemical device according to claim 1, wherein flow rate of the fluid supplied from said fluid supply device is not less than 1 cc/min but not more than 1000 cc/min.
5. The microchemical device according to claim 1, wherein an equivalent diameter of the cross sectional area of the minute flow channel member is not larger than 80% of an equivalent diameter of a portion whose cross sectional area is the smallest in the reaction zone.
6. A method for fabricating the microchemical device according to claim 1, comprising
    forming the flow channels before forming the minute flow channel members.
7. The method according to claim 6, further comprising
    forming the minute flow channel members in flow channels in a manner in which total summations of sequence numbers for forming the minute channel members arranged in respective flow channels become as equal as possible for all of the flow channels.

* * * * *